US008791675B2

(12) United States Patent
Black

(10) Patent No.: US 8,791,675 B2
(45) Date of Patent: Jul. 29, 2014

(54) MOBILE WIRELESS COMMUNICATIONS DEVICE INCLUDING REMOVABLE ELECTRICAL POWER SUPPLY MODULE AND RELATED METHODS

(75) Inventor: Jonathan Black, Lynchburg, VA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 1001 days.

(21) Appl. No.: 12/728,900

(22) Filed: Mar. 22, 2010

(65) Prior Publication Data

US 2011/0227551 A1 Sep. 22, 2011

(51) Int. Cl.
*G05F 1/569* (2006.01)
*H01M 10/42* (2006.01)
*H02M 3/158* (2006.01)
*H02M 1/32* (2007.01)
*H01M 10/48* (2006.01)
*H01H 79/00* (2006.01)
*H02J 7/00* (2006.01)

(52) U.S. Cl.
CPC .............. *H01M 10/48* (2013.01); *H02J 7/0065* (2013.01); *H02J 7/00* (2013.01); *H01M 10/42* (2013.01); *H02M 3/158* (2013.01); *H02M 1/32* (2013.01); *Y02E 60/12* (2013.01); *H01H 79/00* (2013.01)
USPC ...................................................... 323/276

(58) Field of Classification Search
USPC ................. 323/273, 275–277, 282–286, 290
See application file for complete search history.

(56) References Cited

U.S. PATENT DOCUMENTS

| 4,709,201 | A | 11/1987 | Schaefer et al. | 320/2 |
| 4,709,202 | A | 11/1987 | Koenck et al. | 320/43 |
| 5,804,894 | A | 9/1998 | Leeson et al. | 307/130 |
| 6,104,170 | A * | 8/2000 | Lenk et al. | 320/163 |
| 6,111,391 | A * | 8/2000 | Cullen | 323/223 |
| 6,157,171 | A | 12/2000 | Smith | 320/133 |
| 6,184,658 | B1 | 2/2001 | Mori et al. | 320/134 |
| 6,204,645 | B1 * | 3/2001 | Cullen | 323/223 |
| 6,307,349 | B1 | 10/2001 | Koenck et al. | 320/112 |
| 6,331,763 | B1 | 12/2001 | Thomas et al. | 320/136 |
| 6,518,731 | B2 | 2/2003 | Thomas et al. | 320/136 |
| 6,697,241 | B1 | 2/2004 | Smith | 361/91.1 |

(Continued)

OTHER PUBLICATIONS

"PolySwitch Strap Devices Help Protect Rechargeable Battery Packs," by Tyco Electronics, is available at www.circuitprotection. com, created Nov. 7, 2008.

*Primary Examiner* — Adolf Berhane
(74) *Attorney, Agent, or Firm* — Allen, Dyer, Doppelt, Milbrath & Gilchrist, P.A.

(57) ABSTRACT

A mobile wireless communications device may include a device housing, and mobile wireless communications device circuitry carried by the device housing. The device may also include a removable electrical power supply module coupled to the mobile wireless communications device circuitry. The removable electrical power supply module may include a module housing, and within the module housing, a battery cell, a DC-to-DC converter coupled to the battery cell, and an output inductor coupled to the DC-to-DC converter. The removable electrical power supply module may also include, within the module housing, a spark suppression circuit coupled to the output inductor, and an output voltage clamp circuit coupled to the output inductor. The removable electrical power supply module may further include a pair of output terminals carried by the module housing and coupled to the output voltage clamp circuit.

21 Claims, 3 Drawing Sheets

(56) References Cited

U.S. PATENT DOCUMENTS

| | | | |
|---|---|---|---|
| 6,914,416 B2 | 7/2005 | Thomas et al. | 320/136 |
| 6,947,774 B2 | 9/2005 | Davis | 455/572 |
| 7,459,885 B2 | 12/2008 | Miyamoto | 320/134 |
| 7,737,658 B2* | 6/2010 | Sennami et al. | 320/128 |
| 7,893,655 B2* | 2/2011 | Veselic | 320/128 |
| 7,957,160 B2* | 6/2011 | Babcock et al. | 363/16 |
| 7,965,058 B2* | 6/2011 | Veselic | 320/128 |
| 8,259,428 B2* | 9/2012 | Mollema et al. | 361/103 |
| 8,575,889 B2* | 11/2013 | Platania et al. | 320/103 |
| 8,594,314 B2* | 11/2013 | Kitchin et al. | 379/324 |
| 2008/0280568 A1* | 11/2008 | Kielb et al. | 455/74.1 |
| 2010/0067156 A1* | 3/2010 | Lark | 361/57 |

* cited by examiner

MOBILE WIRELESS COMMUNICATIONS DEVICE INCLUDING REMOVABLE ELECTRICAL POWER SUPPLY MODULE AND RELATED METHODS

FIELD OF THE INVENTION

The present invention relates to the field of communications, and, more particularly, to mobile communications devices and related methods.

BACKGROUND OF THE INVENTION

A mobile wireless communications device may include a voltage regulated battery pack and mobile wireless communications circuitry coupled thereto. A typical voltage regulated battery pack and the mobile wireless communications device circuitry are generally not intrinsically safe (IS), and may be, for example, a spark source. A voltage regulated battery pack and mobile wireless communications device circuitry may be considered intrinsically safe if they collectively meet a standard for intrinsic safety, for example, if they meet the current Factory Mutual (FM) standard that defines IS requirements.

More particularly, a typical voltage regulated battery pack is not intrinsically safe and generally does not include an output that is infallibly voltage clamped to ensure that a maximum voltage used in determining intrinsic safety is not exceeded. For example, a typical battery pack mated with mobile wireless communications device circuitry may not meet the most current standard for intrinsic safety since the maximum voltage available from the battery pack is too high for a corresponding overall capacitance for the mobile wireless device circuitry and mated battery pack. For example, a battery pack that outputs 9.6V (1.6V maximum per cell×6 cells=9.6V) typically allows for a about 20-22 µF of total capacitance including the mobile wireless communications device circuitry. A capacitance above this level may make the mobile wireless communications device not intrinsically safe. Most mobile wireless communications device circuitry generally has a capacitance greater than what is allowed by the standard for the given output voltage of the voltage regulated battery pack.

One approach to making the mobile wireless communications device circuitry and the battery pack intrinsically safe includes reducing the capacitance of the mobile wireless communications device circuitry. However, reducing the overall capacitance of the mobile wireless communications device circuitry, for example, to the target 20-22 µF total capacitance value, may be below what is generally needed for the mobile wireless communication device to comply with operational guidelines, for example Federal Communications Commission (FCC) regulations, and to meet applicable performance standards, for example, Telecommunications Industry Association (TIA) standards.

Another approach includes selectively reducing capacitances within the mobile wireless communications device circuitry. For example, voltages may be clamped where relatively large capacitances are located in the mobile wireless communications device circuitry. Thus, the relatively large capacitances may be removed from the intrinsically safe analysis. However, such an approach generally requires additional discrete components, for example, two Zener diodes or silicon-controlled rectifiers (SCR), connected to the capacitors with a trace that should be 2 mm wide.

Other protection schemes for a battery pack may include circuitry to monitor the output voltage of the battery pack against a threshold. For example, U.S. Pat. No. 7,459,855 to Miyamoto discloses a battery voltage monitoring apparatus having a plurality of voltage sensors that output a signal when an over-voltage or low-voltage is detected, and a voltage clamp to limit the voltage. U.S. Pat. No. 4,709,202 to Koenck et al., U.S. Pat. No. 6,184,658 to Mori et al., and U.S. Pat. No. 5,804,894 to Leeson et al. all disclose battery pack monitoring circuits to provide voltage feedback and/or limit charging and discharging of the battery pack.

U.S. Pat. No. 6,518,731 to Thomas et al. discloses a protection circuit for use with a rechargeable battery pack and battery pack charger. The protection circuit includes a shunt regulator and temperature dependent resistor coupled in series between the charger and battery. The temperature dependent resistor is also coupled to the shunt regulator to limit current through the shunt regulator if the current exceeds a threshold.

U.S. Pat. No. 6,697,241 to Smith discloses a circuit for preventing high voltage damage metal-oxide-semiconductor field-effect transistor (MOSFET) switch. The circuit includes a rechargeable battery cell, a parasitic inductor, and a clamp circuit coupled to the MOSFET to conductivity thereof.

In typical mobile wireless communications device circuitry, there are a relatively large number of locations where clamping may be desired. Physical space constraints may limit the addition of components, especially where a reduced physical size of the mobile wireless communications device is important, for example, in a portable application. More particularly, higher powered Zener diodes are generally too large to fit within the mobile wireless communications device circuitry, and if more than one capacitor is being clamped by the same Zener diodes, traces to all other capacitances should be 2 mm wide. Moreover, in some locations, the relatively large capacitances cannot be clamped.

SUMMARY OF THE INVENTION

In view of the foregoing background, it is therefore an object of the present invention to provide mobile wireless communications device including a voltage regulated battery pack and mobile wireless communications device circuitry that can meet more rigorous standards, and without using additional components in the mobile wireless communications device circuitry.

This and other objects, features, and advantages in accordance with the present invention are provided by a mobile wireless communications device that may include a device housing. The mobile wireless communications device may also include mobile wireless communications device circuitry carried by the device housing, for example. The mobile wireless communications device may also include a removable electrical power supply module coupled to the mobile wireless communications device circuitry. The removable electrical power supply module may include a module housing, and within the module housing, a battery cell or multiple battery cells, a DC-to-DC converter coupled to the battery cell(s), and an output inductor coupled to the DC-to-DC converter, for example.

The removable electrical power supply module may also include, within the module housing, a spark suppression circuit coupled to the output inductor, and an output voltage clamp circuit coupled to the output inductor. The removable electrical power supply module may further include a pair of output terminals carried by the module housing and coupled to the output voltage clamp circuit, for example. Accordingly, a mobile wireless communications device is provided with additional overall circuit protection, but without using additional components in the mobile wireless communications device circuitry.

The mobile wireless communications device may further include a voltage regulator within the module housing and that may be coupled between the output inductor and the output voltage clamp circuit, for example. The voltage regulator may be a low-dropout voltage regulator. The DC-to-DC converter may include a step-up, switching, DC-to-DC converter, for example.

The output voltage clamp circuit may include a power monitor circuit, and a crowbar protection circuit coupled thereto. For example, in some embodiments, the output voltage clamp circuit may include a Zener diode, a silicon controller rectifier (SCR) coupled to the Zener diode, and a resistor coupled to the Zener diode and the SCR. The spark suppression circuit may include a pair of Zener diodes coupled in a back-to-back configuration across the output inductor, for example.

The mobile wireless communications device circuitry may include wireless transceiver circuitry, for example. And the at least one battery cell may include at least one rechargeable battery cell.

A method aspect is directed to a method for making a removable electrical power supply module to power a mobile wireless communications device that includes a device housing and mobile wireless communications device circuitry carried by the device housing. The method may include providing a module housing and assembling at least, within the housing, at least one battery cell, a DC-to-DC converter coupled to the at least one battery cell, and an output inductor coupled to the DC-to-DC converter, for example. The method may further include assembling at least, within the housing, a spark suppression circuit coupled to the output inductor, and an output voltage clamp circuit coupled to the output inductor, for example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
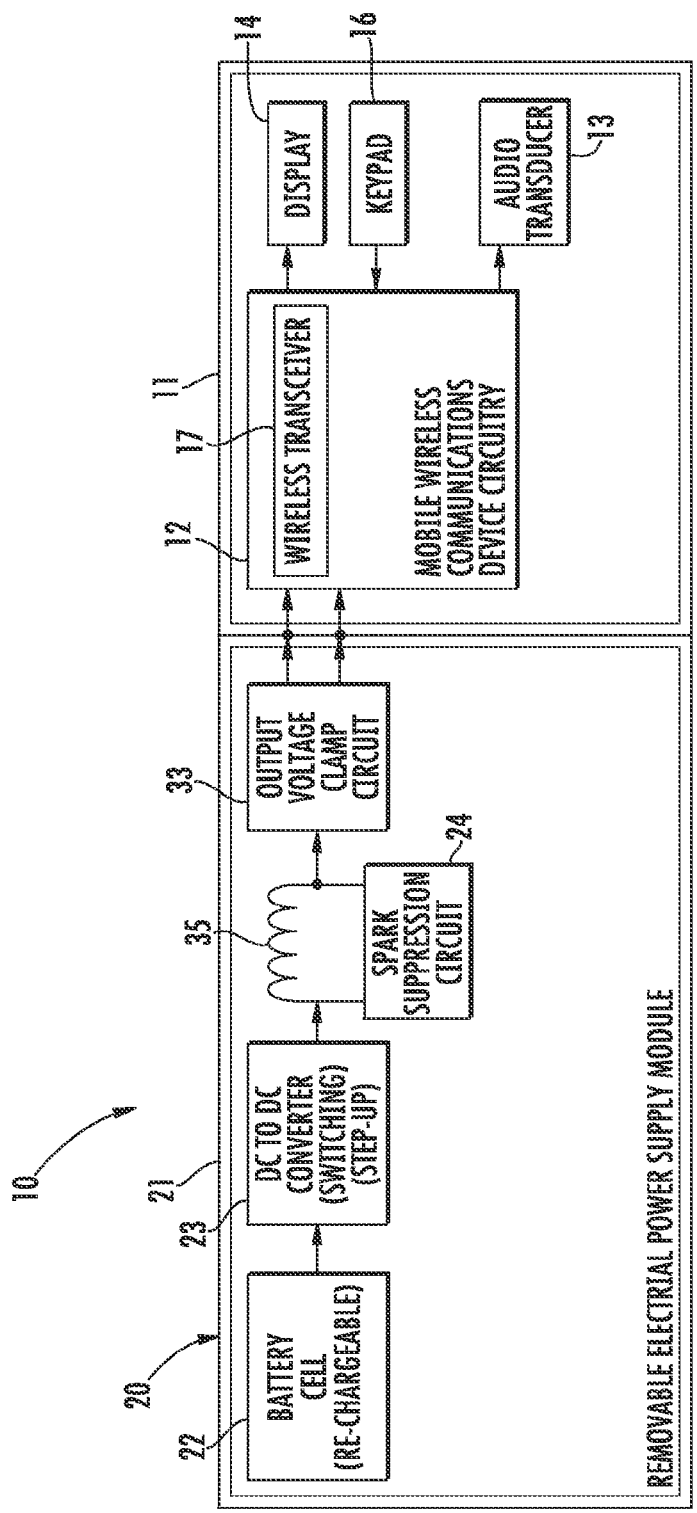
FIG. 1 is a schematic block diagram of a mobile wireless communications device in accordance with the present invention.

Referring initially to FIG. 1, a mobile wireless communications device 10 includes a device housing 11 and mobile wireless communications device circuitry 12 carried by the device housing. The mobile wireless communications device circuitry 12 includes wireless transceiver circuitry 17. The mobile wireless communications device 10 may be a portable two-way radio, for example, a P5300, P5400, or P7300 portable radio, available from Harris Corporation of Melbourne, Fla. The mobile wireless communications device 10 includes a display 14 coupled to the mobile wireless communications device circuitry 12. A keypad 16 and an audio transducer 13 are also coupled to the mobile wireless communications device circuitry 12. Of course, the mobile wireless communications device may be another type of communications device, such as, for example, a cellular telephone. Such devices may include other mechanisms for user input and output.

The mobile wireless communications device 10 also includes a removable electrical power supply module 20 coupled to the mobile wireless communications device circuitry 12. The removable electrical power supply module 20 includes a module housing 21, and a battery cell 22 within the module housing. The battery cells 22 may be rechargeable battery cells, for example, nickel-cadmium (NiCd), nickel metal hydride (NiMH), or lithium-ion (Li-Ion) battery cells. Other types of battery cells may be used as will be appreciated by those skilled in the art. For example, in a portable radio, such as the P5300, P5400, or P7300 portable radios, three battery cells may be used to produce a nominal 3.75 DC volts.

The removable electrical power supply module 20 also includes a DC-to-DC converter 23 within the module housing 21 and coupled to the battery cell 22. The DC-to-DC converter 23 is a step-up, switching, DC-to-DC converter, for example. More particularly, for example, the step-up, switching, DC-to-DC converter 23 may be a LTC1871 wide input-range, no RSENSE current mode boost, flyback and SEPIC controller, available from Linear Technology, Inc. of Milpitas, Calif. Other DC-to-DC converters may be used. The step-up, switching, DC-to-DC converter 23 advantageously produces the nominal operating voltage for the mobile wireless communications device circuitry 12.

The removable electrical power supply module 20 also includes an output inductor 35 within the module housing 21 and coupled to the DC-to-DC converter 23. The output inductor 35 advantageously filters the output of the DC-to-DC converter 23. The output inductor 35 also advantageously limits the amount of current from the battery cell 22 to the mobile wireless communications device circuitry 12 so that it may not become a spark source. In other words, energy from the battery cell 22 is stored by the output inductor 35. The output inductor may, for example, be up to a 5 µH output inductor to be considered intrinsically safe by certain intrinsic safety standards. Other output inductor values may be selected based upon the operating requirements of the mobile wireless communications device circuitry 12.

The removable electrical power supply module 20 also includes a spark suppression circuit 24 within the module housing 21 and coupled to the output inductor 35. The spark suppression circuit 24 is coupled in parallel with the output inductor 35, and may be useful to meet certain intrinsic safety standards.

Figure 2:
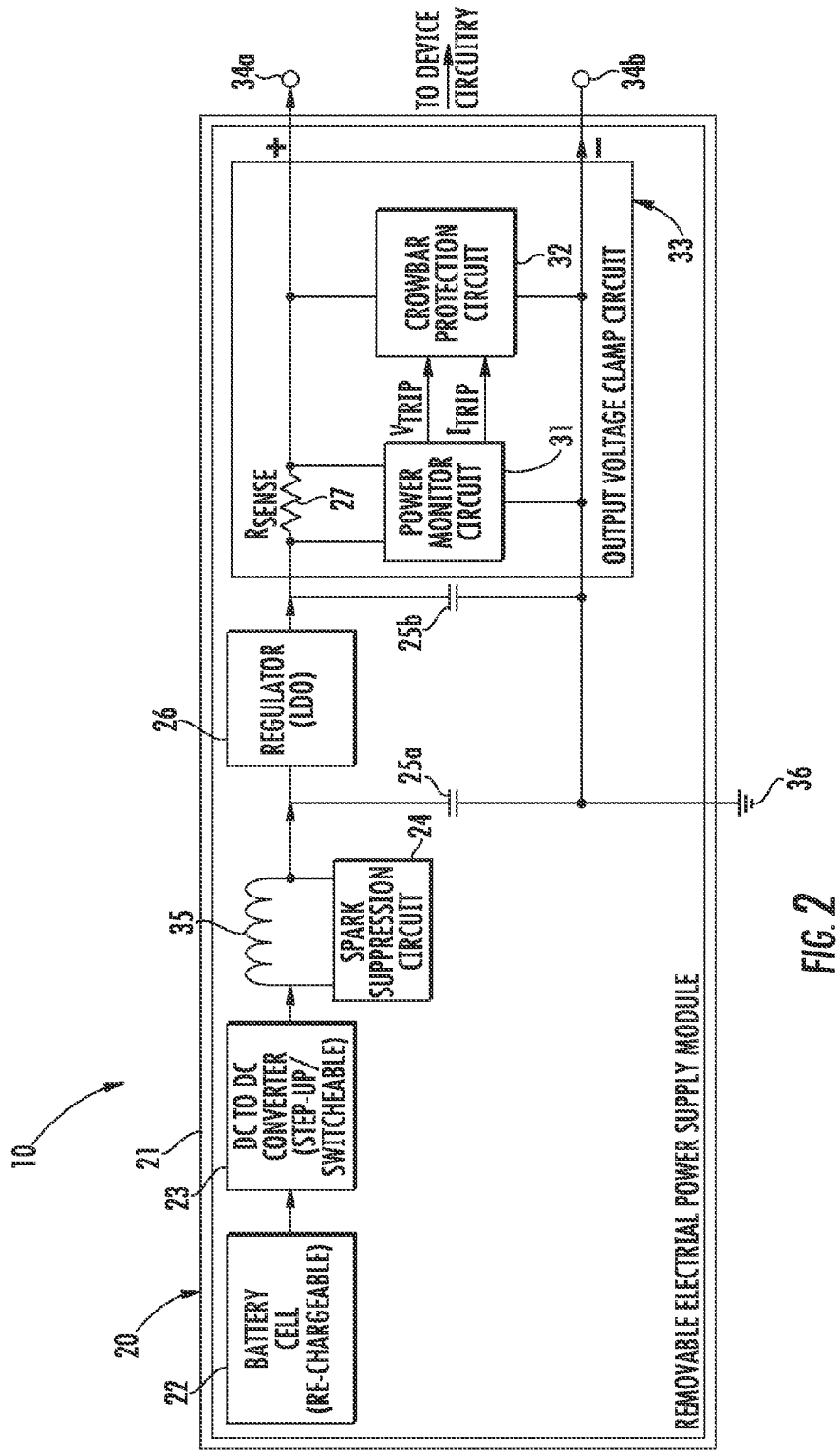
FIG. 2 is a more detailed schematic diagram of an embodiment of a removable electrical power supply module to be used in the mobile wireless communications device of FIG. 1.

Referring now additionally to FIG. 2, the removable electrical power supply module 20 further includes a voltage regulator 26 within the module housing 21 and coupled between the output inductor 35 and the output voltage clamp circuit 33. The voltage regulator 26 may be a low-dropout voltage regulator, for example. More particularly, the voltage regulator 26 may be a LT1764A -3A, fast transient response, low noise, LDO regulator, also available from Linear Technology, Inc. of Milpitas, Calif. Other types of voltage regulators may be used, as will be appreciated by those skilled in the art.

The removable electrical power supply module 20 also includes an output voltage clamp circuit 33 within the module housing 22 and coupled to the output inductor 35. The output voltage clamp circuit 33 advantageously limits the voltage and/or current that is available to the mobile wireless communications device circuitry 12. The output voltage clamp circuit 33 may also be useful to meet certain intrinsic safety standards.

The output voltage clamp circuit 33 includes a power monitor circuit 31 and a sensing resistor 36 for sensing power output from the voltage regulator 26 (FIG. 2). The power monitor circuit 31 outputs voltage and current trip signals $V_{Trip}$, $I_{Trip}$ that are activated when either of the voltage or current output from the voltage regulator 26 exceeds a threshold (FIG. 2). In other embodiments, only one of a trip voltage or trip current may be used. The output voltage clamp circuit 33 also includes a crowbar protection circuit 32 that receives the voltage and current trip signals $V_{Trip}$, $I_{Trip}$ from the power monitor circuit 31.

Based upon the voltage and current trip signals $V_{Trip}$, $I_{Trip}$, the crowbar protection circuit 32 may limit the amount of current and voltage, or remove power to the mobile wireless communications device circuitry 12. For example, referring to the P5300, P5400, or P7300 portable radios, the crowbar circuit 33 may be activated in an over-voltage condition where the output voltage exceeds 6.8 volts, and/or an over-current condition where the output current exceeds 3.7 amperes. Other voltage clamp and current limit thresholds may be set based upon the combined capacitance and inductance of the mobile wireless communications device circuitry 12 and the removable electrical power supply module 20.

A first capacitor 25a is coupled between the output inductor and the voltage regulator and to a ground reference 36. The first capacitor 25a is an output filter for the DC-DC converter 23, as will be appreciated by those skilled in the art. A second capacitor 25b is coupled between the voltage regulator 26 and the output voltage clamp circuit 33, and the ground reference 36. The second capacitor 25b advantageously filters an output of the voltage regulator 26.

The removable electrical power supply module 20 also includes a pair of output terminals 34a, 34b carried by the module housing 21 and coupled to the output voltage clamp circuit 33. For example, with regard to the P5300, P5400, or P7300 portable radios, a 6.6 volt nominal voltage may be output on the pair of output terminals 34a, 34b, in contrast to the typical 9.6 volts.

As will be appreciated by those skilled in the art, a reduction of voltage from 9.6 volts, for example, allows overall capacitance, i.e. combined capacitance from the mobile wireless communications device circuitry 12 and removable electrical power supply module 20 to be approximately 380 μF according to a standard for intrinsic safety, as opposed to 26 μF at 9.6 volts. Advantageously, with regard to the P5300, P5400, or P7300 portable radios, which have a total capacitance value of about 184-215 uF, a reduction of the output voltage, to 6.6 volts, for example, allows the P5300, P5400, or P7300 portable radios to meet a standard for intrinsic safety without making changes, or adding components to the mobile wireless communications device circuitry 12 thereof. Indeed, the removable electrical power supply module 20 may be similarly advantageous for other radios or circuits having different overall capacitance and voltage requirements.

Figure 3:
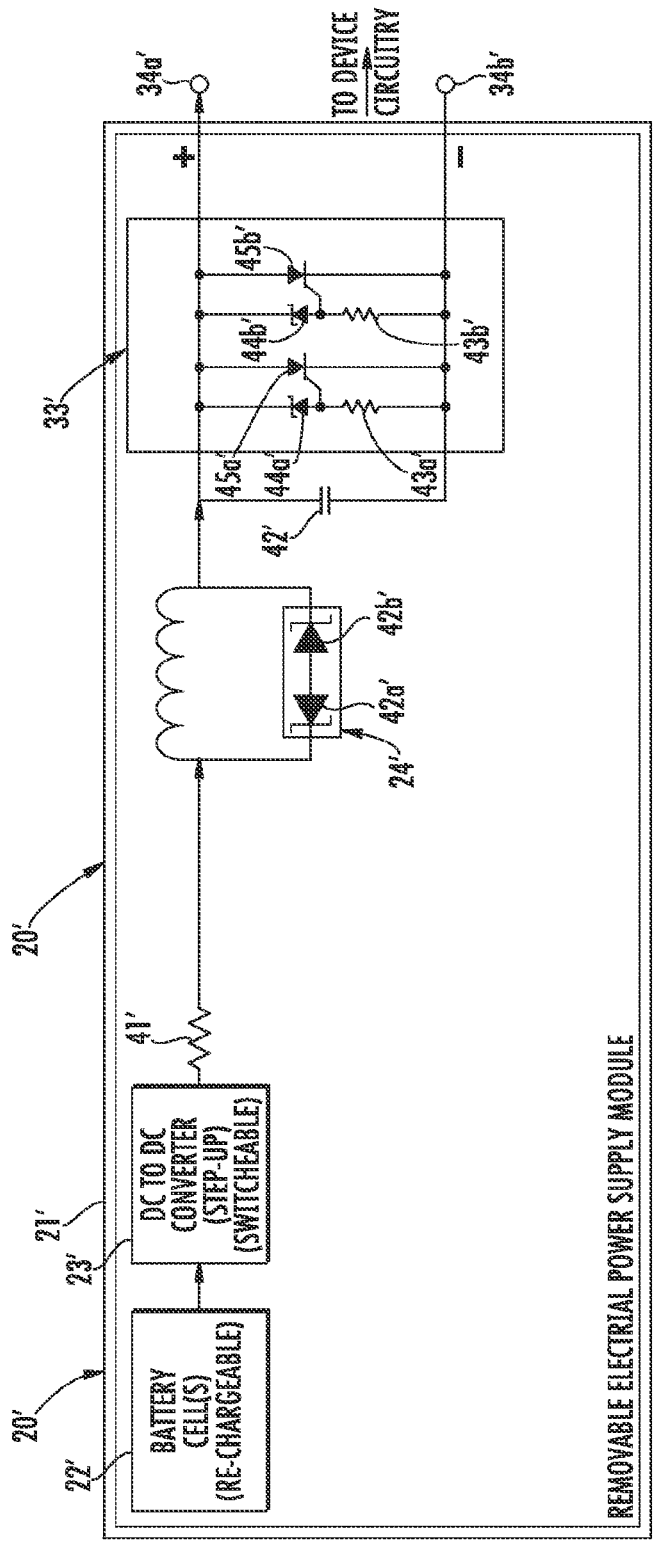
FIG. 3 is a more detailed schematic diagram of another embodiment of a removable electrical power supply module to be used in the mobile wireless communications device of FIG. 1.

Referring now to FIG. 3, another embodiment of the removable electrical power supply module 20' includes a current limiting resistor 41' that is coupled between the DC-to-DC converter 23' and the output inductor 35'. The current limiting resistor 41' may set the current available to the mobile wireless communications device circuitry. In some instances, the current limiting resistor 41' may be useful to meet certain intrinsic safety standards.

The output voltage clamp circuit 33' includes a first Zener diode 44a', a first resistor 43a' coupled in series with the first Zener diode, and a first silicon controller rectifier (SCR) 45a' coupled in parallel with the first Zener diode and the first resistor, and also between the first Zener diode and first resistor. A second Zener diode 44b', a second resistor 43b', and a second SCR 45b' are coupled similarly to the first Zener diode, resistor, and SCR. Each Zener diode 44a', 44b' and each resistor 43a', 43b' advantageously sets the voltage at which the SCR will be activated to clamp (conduct) across the output terminals 34a', 34b'. This advantageously limits the voltage from the battery cell 22' to the SCR trigger voltage, which for example, for the P5300, P5400, or P7300 portable radios is about 6.8 volts. Of course, other SCR trigger voltages may be selected based upon the mobile wireless communications device circuitry.

Additionally, in this embodiment, the spark suppression circuit 24' includes a pair of Zener diodes 42a', 42b' coupled in a back-to-back configuration across output inductor 35'. Of course, other components may be included in the spark suppression circuit 24' as will be appreciated by those skilled in the art. Traces that separate each component of the removable electrical power supply module may be desirably less than 2 mm in accordance with any applicable intrinsic safety standard.

A method aspect is directed to a method for making a removable electrical power supply module 20 to power a mobile wireless communications device 10 including a device housing 11 and mobile wireless communications device circuitry 12 carried by the device housing. The method includes providing a module housing 21 and assembling, within the module housing 21, a battery cell 22, and a DC-to-DC converter 23 coupled to the battery cell. The method also includes assembling, within the module housing 21 an output inductor 35 coupled to the DC-to-DC converter 23, and a spark suppression circuit 24 coupled to the output inductor 35. The method also includes assembling, within the module housing 21 an output voltage clamp circuit 33 coupled to the output inductor 35.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile wireless communications device comprising:
   a device housing;
   mobile wireless communications device circuitry carried by said device housing; and
   a removable electrical power supply module coupled to said mobile wireless communications device circuitry and comprising
   a module housing,
   at least one battery cell within said module housing,
   a DC-to-DC converter within said module housing and coupled to said at least one battery cell,
   an output inductor within said module housing and coupled to said DC-to-DC converter, a spark suppression circuit within said module housing and coupled to said output inductor, an output voltage clamp circuit within said module housing and coupled in parallel with said output inductor, and a pair of output terminals carried by said module housing and coupled to said output voltage clamp circuit.

2. The mobile wireless communications device according to claim 1, further comprising a voltage regulator within said module housing and coupled between said output inductor and said output voltage clamp circuit.

3. The mobile wireless communications device according to claim 2, wherein said voltage regulator comprises a low-dropout voltage regulator.

4. The mobile wireless communications device according to claim 1, wherein said DC-to-DC converter comprises a step-up, switching, DC-to-DC converter.

5. The mobile wireless communications device according to claim 1, wherein said output voltage clamp circuit comprises a power monitor circuit, and a crowbar protection circuit coupled thereto.

6. The mobile wireless communications device according to claim 1, wherein said output voltage clamp circuit comprises a Zener diode, a silicon controller rectifier (SCR) coupled to said Zener diode, and a resistor coupled to said Zener diode and said SCR.

7. The mobile wireless communications device according to claim 1, wherein said spark suppression circuit comprises a pair of Zener diodes coupled in a back-to-back configuration across said output inductor.

8. A removable electrical power supply module to power a mobile wireless communications device comprising a device housing and mobile wireless communications device circuitry carried by the device housing, the removable electrical power supply module comprising:

a module housing;

at least one battery cell within said module housing;

a DC-to-DC converter within said module housing and coupled to said at least one battery cell;

an output inductor within said module housing and coupled to said DC-to-DC converter;

a spark suppression circuit within said module housing and coupled to said output inductor;

an output voltage clamp circuit within said module housing and coupled in parallel with said output inductor; and a pair of output terminals carried by said module housing and coupled to said output voltage clamp circuit.

9. The removable electrical power supply module according to claim 8, further comprising a voltage regulator within said module housing and coupled between said output inductor and said output voltage clamp circuit.

10. The removable electrical power supply module according to claim 9, wherein said voltage regulator comprises a low-dropout voltage regulator.

11. The removable electrical power supply module according to claim 8, wherein said DC-to-DC converter comprises a step-up, switching, DC-to-DC converter.

12. The removable electrical power supply module according to claim 8, wherein said output voltage clamp circuit comprises a power monitor circuit, and a crowbar protection circuit coupled thereto.

13. The removable electrical power supply module according to claim 8, wherein said output voltage clamp circuit comprises a Zener diode, a silicon controller rectifier (SCR) coupled to said Zener diode, and a resistor coupled to said Zener diode and said SCR.

14. The removable electrical power supply module according to claim 8, wherein said spark suppression circuit comprises a pair of Zener diodes coupled in a back-to-back configuration across said output inductor.

15. A method for making a removable electrical power supply module to power a mobile wireless communications device comprising a device housing and mobile wireless communications device circuitry carried by the device housing, the method comprising:

providing a module housing; and assembling at least the following components within the module housing at least one battery cell, a DC-to-DC converter coupled to the at least one battery cell, an output inductor coupled to the DC-to-DC converter, a spark suppression circuit coupled in parallel with the output inductor, and an output voltage clamp circuit coupled to the output inductor.

16. The method according to claim 15, wherein assembling the components within the module housing further comprises assembling a voltage regulator coupled between the output inductor and the output voltage clamp circuit.

17. The method according to claim 16, wherein assembling the voltage regulator comprises assembling a low-dropout voltage regulator.

18. The method according to claim 15, wherein assembling the DC-to-DC converter comprises assembling a step-up, switching, DC-to-DC converter.

19. The method according to claim 15, wherein assembling the output voltage clamp circuit comprises assembling a power monitor circuit, and a crowbar protection circuit coupled thereto.

20. The method according to claim 15, wherein assembling the output voltage clamp circuit comprises assembling a Zener diode, a silicon controller rectifier (SCR) coupled to the Zener diode, and a resistor coupled to the Zener diode and the SCR.

21. The method according to claim 15, wherein assembling the spark suppression circuit comprises assembling a pair of Zener diodes coupled in a back-to-back configuration across the output inductor.

* * * * *